INVENTOR.
TOSHIHIKO TANAKA
BY
CAROTHERS & CAROTHERS
HIS ATTORNEYS

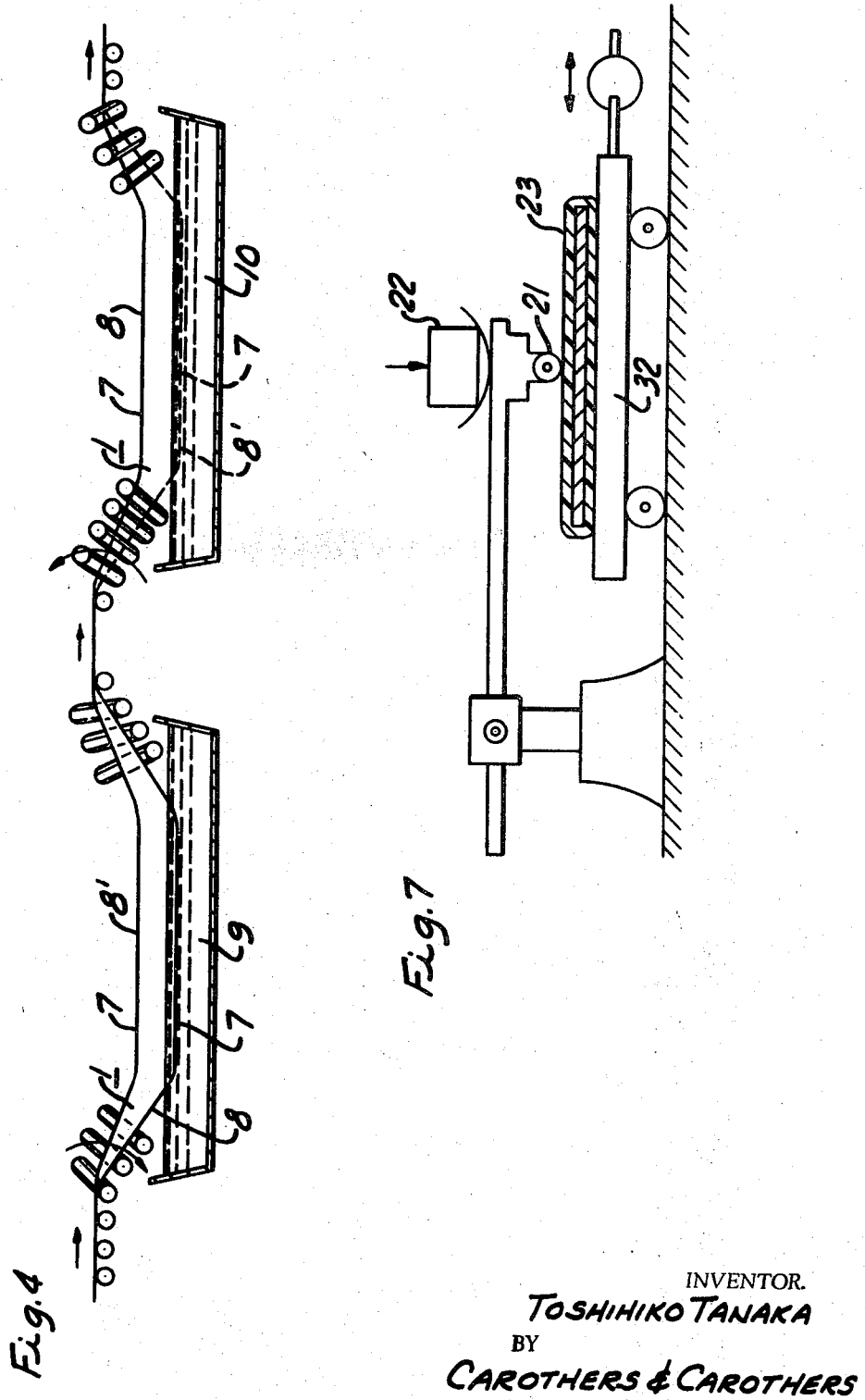

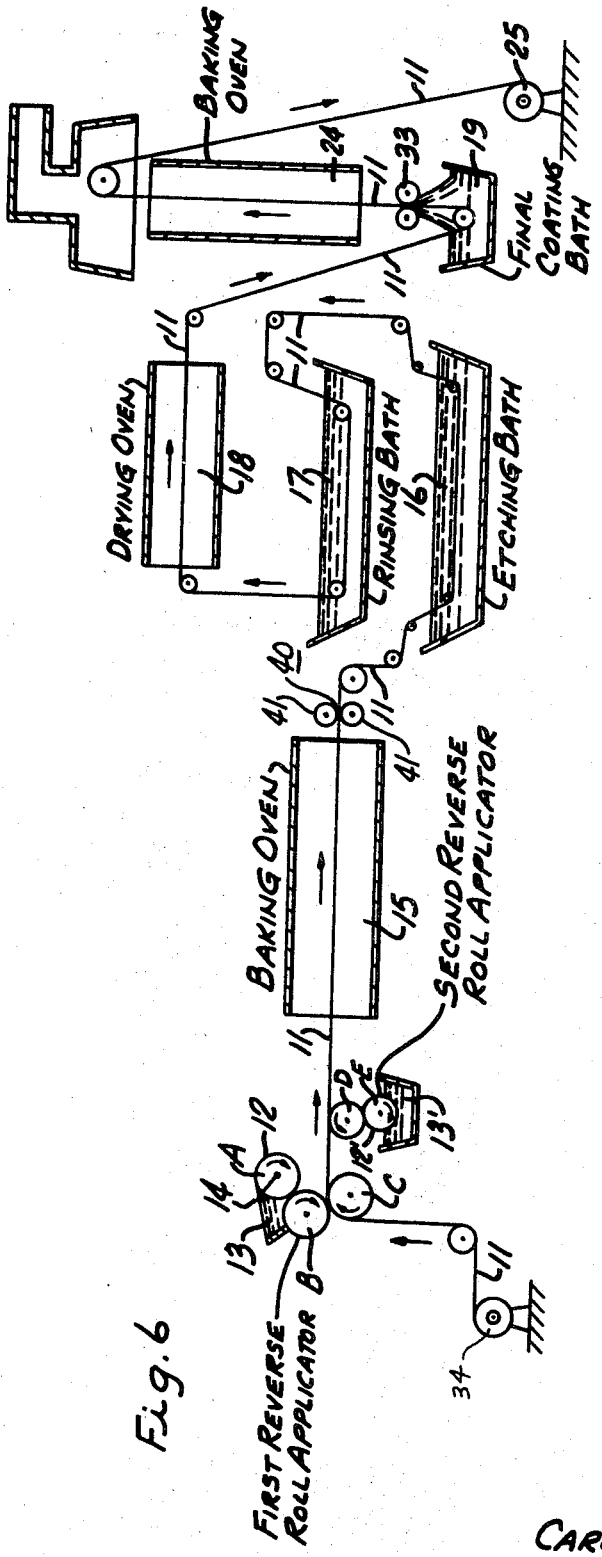

3,525,652
METHOD OF MANUFACTURING AN INSULATED FOIL CONDUCTOR
Toshihiko Tanaka, Nishinomiya, Japan, assignor to Sumitomo Electric Industries, Ltd., Osaka, Japan, a company of Japan
Continuation-in-part of application Ser. No. 514,775, Dec. 20, 1965. This application July 28, 1969, Ser. No. 845,129
Int. Cl. H01b 13/16
U.S. Cl. 156—51          8 Claims

ABSTRACT OF THE DISCLOSURE

A method of manufacturing an insulated metallic foil conductor wherein the coating may be applied by immersion of the strip in a resin base bath or applied to the strip surfaces by reverse transfer roll applicators. In order that the marginal edges of the conductor have been properly coated to provide overall good dielectric strength, the marginal edges of the metallic foil strip with its coated foil surfaces is passed, vertically aligned, through an etching bath and then is reverse twisted 180° and its other marginal edge is passed through an etching bath so that marginal edges of the foil strip are consecutively etched to form a longitudinal pocket therealong, after which the etched edge surface coated strip is immersed in a final resin bath to provide a uniformly deposited integral coating within and over the marginal edge pockets and over the coated foil surfaces of the strip.

CROSS-REFERENCE TO RELATED APPLICATION

This application is a continuation-in-part of patent application Ser. No. 514,775, filed Dec. 20, 1965 and now abandoned.

BACKGROUND OF INVENTION

This invention relates generally to the method of coating foil conductors through the process of running lengths of the foil conductors through an immersion tank containing resinous material used for coating the foil conductor (Cl. 117—115, 232). The foil conductor, after being initially immersed in the resinous coating material, is further processed along the foil conductor edges by means of etching (Cl. 156—3, 18).

More particularly, the invention relates to a metallic foil constructed of aluminum and copper, etc. sandwiched by coatings of thermoplastic or thermosetting resin from such plastic materials as polycarbonates, epoxies, polyvinyls, polyesters, etc. cured and baked on both sides of the foil as coated.

In the past, most coil wires and foil conductors to be used in the manufacture of transformers, motors, coils and solenoids, etc. have been those made of bare wire conductor coated and baked with a polyvinyl formal or similar plastic material as an insulating material, because of their well known and unusually excellent electrical and mechanical properties. For large heavy-duty electric equipment or service where a high temperature of operation is unavoidable, other types of conductors such as rectangular-section wire having the above mentioned baked coatings or the so-called glass-armored conductor covered with glass fiber winding and baked with an insulating coating such as epoxy enamel or the like, has been usually employed.

Recently, requirements for insulating material of an electrical conductor have become more rigid with respect to the characteristic heat resistance. As a result, the polyester has taken the place of the earlier polyvinyl formal and now even Teflon resins and polyimide are employed as an insulating coating of the H class (The Institute of Electrical and Electronic Engineers, U.S.A.). In order to meet the requirements for a higher heat resistance insulating material for conductor coating and to develop a unique insulated coil characterized by higher performance and reliability as well as reduced weight and size, which is very important where space is a factor, every possible effort is being exercised steadily in making further improvement on the new insulating materials and foil design.

The principal problem that has resided in prior methods in the art has been the precise uniform coating with resinous materials foil strips to be used for the manufacture of transformers, motors, and other coils used in electrical equipment. To this end, it is the principal aim of the present invention to overcome these difficulties encountered in the prior art.

SUMMARY OF THE INVENTION

The principal object of the present invention is the provision of a method of coating a foil conductor of aluminum, copper, or the like, with a resinous material in the form of a "sandwich" which is thereafter cured, which resin coated foil conductor meets the requirements of higher heat resistance characteristics as well as reduced weight and size. This improved coating and method are recommended for use in manufacturing small transformers and coils, etc., in response to the recent trend of the wire manufacturing industry as mentioned above.

An important step in the method of coating herein disclosed is the manner in which the surface coated foil strip is aligned and passed through an etching bath to etch a first marginal edge of the foil strip, and thence removing therefrom the foil strip which is then reverse twisted at 180° and passed through a second etching bath to etch the second marginal edge of the foil strip. The rate of movement of the foil strip marginal edges through the etching bath is regulated so that these etching baths are such that the metallic portion removed from the foil strip marginal edges is never more than 20 to 30 microns. This is the desired micron depth of etching since further extensive etching is unnecessary but at the same time, etching must be sufficient to provide a basis in the form of pockets produced along the longitudinal edges of the foil strip because of etching to form an integral final coating of the entire initially coated foil strip which is uniform in depth and thickness.

In order to insure that the marginal edges of the foil strip are not coated when the initial surface coating of the foil strip is performed, the initial coating resin base bath into which the metallic foil strip is placed, is provided with a resin base having viscosity of 150 cps. The use of a low viscosity in the resin base is so that the marginal edges of the foil strip are not adequately covered, surface tension of the initial coating actually drawing away from the marginal edges of the foil strip the base resin material. Further, the marginal edges may be cut prior to etching as a matter of improving etched depth uniformity of the metallic foil conductor at the marginal edge.

By the same token, if the initial step of coating the surfaces of the foil strip conductor is done through the application of transfer roll applicators, then the resin base viscosity is increased to an excess of 3,000 cps., the transfer roll applicators rotating in contact with the foil strip surface in a direction opposite to that of the traveling foil strip.

Other objects and advantages appear hereinafter in the following description and claims.

The accompanying drawings show, for the purpose of exemplification without limiting the invention or the claims thereto, certain practical embodiments illustrating the principles of this invention wherein:

FIG. 4 is a modified form of the etching bath as illustrated in FIGS. 1 and 6.

FIG. 6 is a diagrammatic view and side elevation illustrating a device for measuring the abrasion resistance of the insulated metallic foil strip or conductor upon completion of manufacture through the method comprising this invention.

Figure 1:
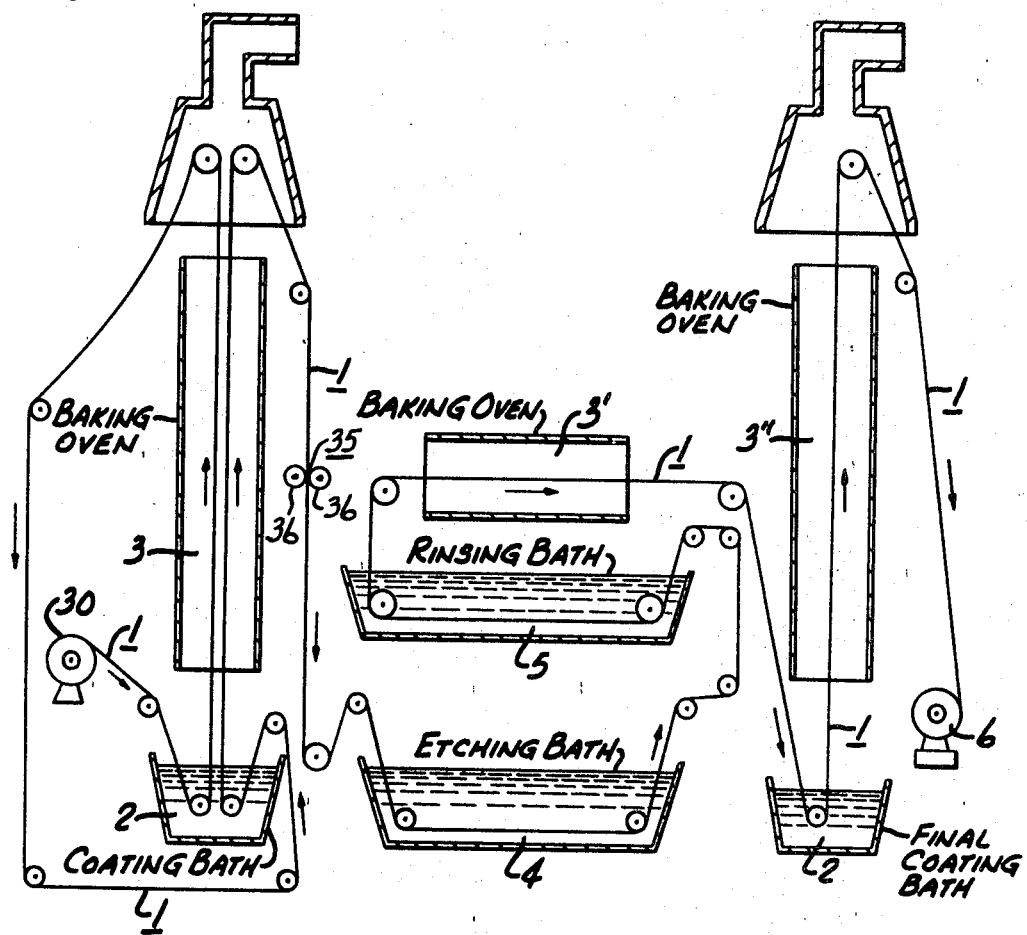
FIG. 1 illustrates the apparatus utilizing immersion baths in performing the method of manufacturing an insulated foil conductor having a conductor core consisting of a thin metallic foil strip with a resin insulating coating comprising this invention.
Figure 2:
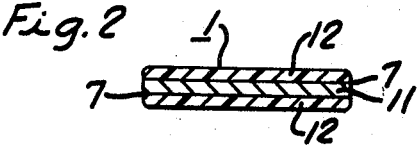
FIG. 2 is a cross sectional illustration of a metallic foil strip initially coated on its surfaces with a resin insulating coating.

In FIG. 1, the apparatus is shown for carrying out in one form the method comprising this invention. The uncoiled foil strip 1 is led into the coating bath 2 for one or more coatings of the insulating resin material and subsequently heated in a baking oven 3 for baking thereon the applied insulating resin material. The coated foil 1 so obtained has a cross section as illustrated in FIG. 2 where the core metallic foil 11 is surface coated with the insulating resin coating 12. Both edges of the cross section of the sandwiched foil strip 1 cannot be coated sufficiently through this first stage of process. Defective coating in the cross section of the sandwiched foil 1 always gives rise to the inter-layer short circuiting or other difficulties in the coil or transformer winding. Thus, the coil or winding is rendered useless. Therefore, separate application of an insulation coating only on the edges 13 of the coated foil 1 is essential for uniform coverage and prevention of inter-layer short circuit trouble in electric apparatus manufacture incorporating sandwiched foil conductors.

Since, as shown in FIG. 2, the coating scarcely, let alone insufficiently, coats the marginal edges of the foil strip, subsequent etching of the metallic foil strip edges is possible without cutting longitudinally the initial marginal edges of the coated strip because of the low viscosity and resultant thinness of the coating process. However, if marginal edge cutting is performed prior to etching as indicated at 35 in FIG. 1 by the slitting rollers 36, an improved etched depth uniformity of the metallic foil at the marginal edges 7 is obtainable upon subsequent etching.

Figure 3:
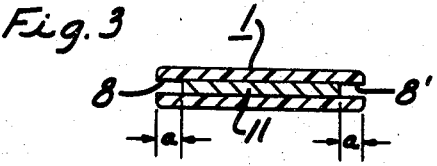
FIG. 3 is a cross sectional view of a metallic foil strip after passage through an acid etching bath.

In FIG. 1 the etching bath 4 to serve for removing chemically the core foil on both edges 7 of the coated foil 1. The bath may contain solution of hydrochloric acid as a mineral acid and sodium carbonate as an alkali. The strip of insulated foil of a sandwich type as illustrated in FIG. 2 is improved with respect to the edge coating as shown in FIG. 3 by being allowed to travel through the etching bath 4. For successful processing of the foil strip 1 in the etching bath 4 in FIG. 1, the sandwiched foil as illustrated in FIG. 2 must always be free from pinholes as otherwise the foil will surely be subject to incurable and unwanted corrosion.

Another type of etching bath shown in FIG. 4 is divided into two consecutive halves 9 and 10 for elimination of the possibility of the problem of corrosion in such a manner that either edge 7 of the coil strip is initially etched in the first bath 9. The travelling foil strip 1, for this purpose is twisted 90° with special caution not to cause the elongation of the edges through the twisting tension. The strip 1 is dipped, on edge 8 into the etching solution by an immersion depth of 5–10 mm. This is repeated in the second bath 10 for etching of the other edge 8' which can be accomplished by reverse twisting of the traveling foil strip as illustrated in FIG. 4. The resultant foil strip 1 has perfect continuity of surface etching as represented by cross section illustrated in FIG. 3. This uniform depth in etching is accomplished by running the surface coated foil strip 1 through the etching baths at a uniform speed. The strip of surface coated foil 1 is then washed in the rinsing bath 5 in FIG. 1 to be freed from the etching solution upon leaving the second bath 10.

Figure 5:
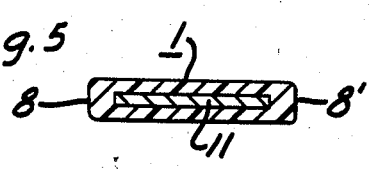
FIG. 5 is a cross sectional view of a metallic foil strip after completion of final resin coating.

The traveling strip is subsequently conveyed into a second drying oven 3' and fed to the second coating bath 2' for re-coating and subsequent baking in the oven 3" whereupon the strip 1 is wound on the take-up coiler 6. Now the coated foil is ready for perfect baking to assure permanent setting of coat as illustrated in FIG. 5.

An embodiment of the invention is disclosed by way of example in restoring to the use of polyvinyl formal, epoxy, polyester or polyimide as an insulating coating material. The coating material is diluted to a concentration of 6–10 percent with a suitable diluent and adjusted to a viscosity of about 100 cps. Viscosity must be kept below at least 150 cps. so that the marginal edges of the foil strip, are not adequately coated due to the surface tension of the surface coating 12.

The coating material so prepared is charged into the coating bath 2 and then kept still for a while to be freed from bubbles, etc. Metallic foil employed was 0.045 mm. thick and 100 mm. wide aluminum. The foil strip 1 must be thoroughly degreased and care must be taken that the foil is freed from the dust of aluminum which may be present on both edges. Dust of aluminum, if any, on the surface of the foil strip is a cause of pinholes and electrically conductive particles in the coating which in turn exerts an adverse effect in the electric characteristics of the finished insulated metallic foil in pursuance of the method comprising this invention which deserves special attention.

The strip of aluminum foil starts at the uncoiler 30 and travels into the bath 2 for dip coating. In the above example, the traveling speed of the strip was 1 m. per minute. Thickness of the resin film of one coating is to be controlled properly depending on the concentration and viscosity of prepared coating material charged in the coating bath 2 and the number of coating applied. The baking oven 3 is 1.3 m. in length. The baking oven 3 is adjusted to various baking temperatures depending on the type of applied insulating material such as, for example, 320° C. for polyvinyl formal and epoxy, 350° C. for polyester and 380° C. for polyimide. The foil strip coated with the insulating resin film on both sides was adequate baked in the baking oven and was imperfect, in that, the edges were insufficiently coated as illustrated diagrammatically by the cross section shown in FIG. 2. Therefore, the coated foil strip is then allowed to travel through the etching bath containing 6 N aqueous solution of hydrochloric acid to cause the chemical removal of the uncoated edges, thus obtaining the improved cross section of the sandwiched foil as illustrated in FIG. 3. For this etching, the strip is so twisted that it can be etched only on one edge 8 and then on the other edge 8' as shown in FIG. 4. Etching has only to be applied to 20–30µ of the core edge where the core 11 becomes lost as indicated at $a$ in FIG. 3. Accordingly, $a$ represents a longitudinal pocket of the sandwiched foil with comparative imperfection both electrically and mechanically, which requires application of one more coating of insulating material and then is subsequent baking to be carried out in practice similar to the original coating of the foil strip.

Having left the etching bath 4 in FIG. 1, the traveling strip of the coated foil is allowed into the rinsing bath 5 for washing with fresh water, then into the drying oven 3' adjusted to a drying temperature of 130° C. and finally into the second coating bath 2' for re-coating. The re-coated strip of foil can have a perfect insulation coating, as represented by the cross section illustrated in FIG. 5, after leaving the baking oven 3" adjusted for a proper baking temperature as was the case in connection with the prior baking. The dimensional data and the electric characteristics of the insulated metallic foil after completion of the full course of the coating process is listed in Table 1 below conforming with the experimental processing performed. Any variance of thickness of polyimide coating film of the foil could be adjusted to 0.011 mm. on one side and to 0.013 mm. to 0.014 mm. on the other side. If transverse irregularity of coating film thickness of the strip of the insulated foil is serious, the strip as taken up on the coiler tends to become deformed with respect to the contour of the coil, meaning unsuccessfulness in obtaining a good coil design. In the experiment carried out with respect to this embodiment of the invention, the irregularity of the coating film thickness could be reduced to below $\pm 0.002$ mm.

For the electrical characteristics of the finished insulated foil conductor, the dielectric strength and the insulation resistance were measured. All values of dielectric strength listed in Table 1 are the results of measurement in the air and those in the column identified as "surface" correspond to the dielectric strength by application of voltage increased at a rate of 100 v. per minute with 25 mm. electrode and applied load of 500 gr. to 20 different positions on the sandwiched foil.

Another measurement on the insulated foil conductor was elongation by 3 percent performed in the same manner as preceding measurement with the results that the use of polyvinyl formal gave a dielectric strength very close to that obtained without elongation.

Two sheets of 30 mm. long insulated foil conductor were placed one over another and the dielectric strength of combination of these two sheets was measured, applying a load of 500 gr. in order to see whether an inter-layer short circuit may take place between separate insulated foil conductors one over another. The result so obtained provides a very important guide for judgment of possibility of short circuit complications. As is readily known from the data given in Table 1, in the 3 percent elongated insulated foil test, the dielectric strength is almost twice the same for that of the surface, without edge-to-edge inter-layer short circuit and always with the breakdown only in the surface. This may be considered as an indication that the insulating also on the edge has been made perfect. Results of measurement of the insulation resistance between two sandwiched conductors placed one over another and then coiled together were found to be $10^{10}$–$10^{11} \Omega$ for any type of coating material, thus providing a good proof of satisfactory insulation resistance of the insulated foil of the conductor pursuant to the invention.

TABLE 1

| | Dimensions | | | |
| --- | --- | --- | --- | --- |
| | Thick. (Al) (mm.) | Width (Al) (mm.) | Total thick. (mm.) | Insulation thick. (one side: mm.) |
| Polyvinyl formal | 0.045 | 100 | 0.073 | 0.014 |
| Epoxy | 0.045 | 100 | 0.073 | 0.014 |
| Polyester | 0.045 | 100 | 0.071 | 0.013 |
| Polyimide | 0.045 | 100 | 0.071 | 0.011 |

| | Electrical Properties | | | |
| --- | --- | --- | --- | --- |
| | Surface | 3% elong. surface | Double sheet (300 mm., 500 gr.) | DC 100 v. 25° C. ($\Omega$ –m.) |
| Polyvinyl formal | 500–1,090 | 500–900 | 1,200–1,300 | $0.18 \times 10^{12}$ |
| Epoxy | 450–980 | 250–480 | 800–1,400 | $0.21 \times 10^{11}$ |
| Polyester | 500–1,000 | 240–440 | 1,400–1,700 | $0.11 \times 10^{12}$ |
| Polyimide | 500–820 | 280–600 | 1,200–1,300 | $0.15 \times 10^{11}$ |

FIG. 7 illustrates the arrangement of measuring the abrasion resistance, one of the mechanical properties of the insulated foil conductor. The resistance of the tested specimen 23 was determined through the number of repeated reciprocations by the mobile tray 32 to apply an abrasive force on the surface of the foil conductor 23 with a 3 cm. stroke, 1 kg. load was applied by the 6 mm. steel ball 21, before the insulation coating was first broken.

The result of this testing as expressed in the terms of repeated number of reciprocations was 30–45 strokes for all tested specimens having different types of coating material. Tensile strength of the insulated foil conductors constructed pursuant to the invention was 10–15 kg. per mm. which posed no problem whatsoever for taking up on the automatic coiler. The result of another measurement for heat deterioration, one of the thermal properties, consisted of 48 hours heataging at 160° C. for polyvinyl formal, 170° C. to 200° C. for polyester and 300° C. for polyimide. None of the specimens aged at the above specified high temperatures were subjected to cracking and pinholes when bent at an angle of 180°.

The insulating coating method just described is prepared in accordance with the embodiment of the invention by dipping the foil strip 1 in a low viscosity insulating material. Another manner in which a coating may be applied is characterized by a high viscosity and high resin content can be accomplished by roll coater method representing another example of embodiment which is as follows.

FIG. 6 illustrates the arrangement of roll coater process where the metallic foil strip 11 is applied between the reverse coating rolls 12 and 12'. The arrows in FIG. 6 show the direction of the roll's rotation. The pool of coating material 13 is evenly applied to the roller 12 by the doctor blade 14. The coated foil strip baking in oven 15 then proceeeds on for etching in etching bath 16 which is equivalent to that shown in FIG. 1 after which it is rinsed in the rinsing bath 17 and finally dried in the second drying oven 18. The bath 19 for final coating is similar to the bath in FIG. 1, and it should be noted that coating of the strip according to this embodiment of the invention requires the squeeze rolls 33. Final baking is in the baking oven 24 and then the finished coil strip is taken up on the take-up coiler 25. The metal strip 11 used in this particular process was 0.045 mm. thick and 100 mm. wide aluminum foil. The strip of foil must, as in the previous case, be adequately degreased and made free from aluminum dust on both edges of coiled strip in advance of the actual coating for successful result in coating the foil strip. The uncoiled strip 11 of aluminum foil is guided from the uncoiler 34 to the reverse roll coater 12 for coating of one side. The rolls A and C in the reverse roll coater 12 are metal rolls and B is the neoprene-lined coating roll made of steel. These rolls were finished to a machining accuracy of 4 per 1,000 mm. The roll A is equipped with the doctor blade 14 to remove excess liquid of the coating material to prevent the outward escape of coating liquid which is supplied from the pool 13 in FIG. 6. The coating material is then transferred to the surface of the rotating roll B after the coating thickness is regulated by controlling the gap between two rolls A and B and finally applied to the surface of the strip of aluminum foil traveling between the two rolls B and C. It should be noted that the direction of travel of the strip of aluminum foil and the rotation of roll B must always be reversed with one another for successful coating. Speed of the roll B was 130 percent of that of roll C. Having been coated on one surface of the foil strip 11 with the reverse roll coater B, the strip of foil is coated on the other side by means of the second reverse roll coater D, in which the coating material in the pan 13' below the roll E is picked up and then applied to the other side of the traveling strip by the coater D, after being controlled with respect to the coating thickness by adjusting the gap between two rolls E and D. For coating with the second coater, direction of the strip's traveling and that of the roll D were reversed with one another and the circumferential speed was set to be 130 percent of that of the traveling speed of the strip of aluminum foil. Coating materials were the polyvinyl formal having a viscosity of 12,000 cps. and resin content of 16 percent, polyester having a viscosity of 5,000 cps. and resin content 40 percent, epoxy having having a viscosity of 8,000 cps. and resin content of 30 percent and polyimide having a viscosity of 4,000 cps. and resin content of 16 percent. For successful coating of metallic foil by means of the reverse roll coater, viscosity of the coating material to be applied should preferably be in excess of at least 3,000 cps. The baking temperature in the oven 15 was adjusted to 350° C. for polyvinyl formal, to 400° C. to 420° C. for both epoxy and polyester, and to 400° C. to 450° C. for polyimide. Traveling speed of the strip of aluminum foil was set to 8 m. per minute to 20 m. per minute and the thickness of coating was adjusted to 14µ for every side of the foil with success in obtaining the satisfactory insulating coating on the strip 11 of foil. Baking in the oven 15 was effected by means of air floating system without mechanical contact whatsoever. The cross section of the coated foil leaving the baking oven 15 being similar to that resulting from the previous example of embodiment of the invention as illustrated in FIG. 2. The subsequent procedure to finish the coated strip of foil is the same as in the case of the dipping method shown in FIG. 4.

Since, as shown in FIG. 6, the coating scarcely, let alone insufficiently, coats the marginal edges of the foil strip, subsequent etching of the metallic foil strip edges is possible without cutting longitudinally the initial marginal edges of the coated strip because of the thinness of the coating process. However, if marginal edge cutting is performed prior to etching as indicated at 40 in FIG. 6 by the slitting rollers 41, an improved etched depth uniformity of the metallic foil at the marginal edges 7 is obtainable upon subsequent etching.

The 3 m. long etching bath 16 contains a 6 N aqueous solution of hydrochloric acid where the uncoated edge of the aluminum foil is etched until the cross section of the sandwiched foil is improved to be as illustrated in FIG. 3. a in FIG. 3 of 20µ to 30µ is sufficient enough to realize an acceptable coating. The traveling strip of foil is subsequently allowed into the drying oven 18 adjusted to a drying temperature of 130° C. and then into the third coating stage 19 which is a coating bath similar to 2 in FIG. 1 designed for dip coating with the same coating material as in the coating pan 13' in FIG. 6. Excess coating material applied to the strip of foil traveling through the coating bath 19 is removed by the squeeze rolls 33 for coating of both edges 8 and 8' shown in FIG. 3, thus resulting in the cross section of the sandwiched foil as illustrated in FIG. 5. Purpose of this last coating is not to give additional coating to the surface on both sides for increasing the coating thickness, but to coat the edges 8 and 8' only. The vertical baking open 24 for baking the edges 8 and 8', for which the baking temperature is preferably equal to or about 60° C. lower than that in the previous baking oven 15. The strip of coated foil taken up on the coiler 25 has a satisfactorily insulated construction of cross section as illustrated in FIG. 5. Dielectric strength for the surface coating has been found almost equal to that realized by the dipping process or to be AC 400 v. to 1,000 v. Total dielectric strength of two coated foils, one over another, has been found to be AC 800 v. to 1,400 v., nearly twice that of the surface coating of one sheet of coated foil, without edge-to-edge (interlayer) short circuit and with all breakdown characteristics only in the surface. As described precedingly, the insulated metal foil conductor manufactured in accordance with the invention is characterized, in comparison with the conventional sheet-wound coil having metal foil sandwiched by the paper sheet, and enameled copper wire, by (1) improved coiling ability, (2) improved heat radiation, (3) reduced space factor and (4) reduced weight and larger flexibility meaning improved ease of handling and is free from the difficulty of being feeble in strength as was the case with the conventional enameled copper wire, and, as such, is recommended for use in manufacturing sheet-wound coils.

With respect to the type of insulating coating material, correct choice of the heat resistance characteristics for matching the design of a particular electric equipment or apparatus wherein the insulated foil conductor manufactured in accordance with the invention is to be used as an essential material will serve to ensure the complete fullfillment of the invention. Although the description of the invention has been made with a certain degree of particularity, it is understood that the present disclosure has been made only by way of example and that numerous changes in details may be resorted to without departing from the spirit and the scope of the invention as hereinafter claimed.

I claim:

1. The method of manufacturing an insulated foil conductor having a conductor core consisting of a thin metallic foil strip with a resin insulating coating comprising the steps of
    (a) immersing the metallic foil strip into a resin base bath having a viscosity below 150 cps. to form a thin coat of resin over the foil surfaces,
    (b) baking the coated foil strip to cure the resin coating,
    (c) twisting to vertical alignment the coated foil strip without applying tension to the coated foil strip edges,
    (d) passing the lower edge of the coated foil strip, as aligned, through a first acid etching bath to chemically remove a portion of the metallic edges of the foil strip forming a longitudinal pocket between the marginal edges of the foil strip coating surfaces,
    (e) removing the foil strip from the acid bath,
    (f) reverse twisting the coated foil strip 180° without applying tension to the coated foil strip edges,
    (g) passing the lower edge of the coated foil strip, so twisted, through a second acid etching bath to chemically remove a portion of the metallic edges of the foil strip forming a longitudinal pocket between the marginal edges of the foil strip coating surfaces,
    (h) regulating the rate of movement of the coated foil strip through the acid etching baths so that the metallic portion removed from each of the foil strip edges is within the range of 20 to 30 microns of foil depth,
    (i) immersing the etched edge, coated foil strip into a rinsing bath to remove the acid etchant,
    (j) drying the rinsed strip,
    (k) immersing the etched edge, coated foil strip into a second resin base bath to uniformly deposit an integral coating within and over the marginal edge pockets and over the coated foil surfaces, and
    (l) thereafter baking the fully coated foil strip to cure the resin coating.

2. The method of manufacturing of claim 1 which includes the step of longitudinally cutting the marginal edges of the resin coated and baked foil strip prior to the steps of passing the foil strip edges through the acid etching baths to improve the etched depth uniformity upon subsequent etching.

3. The method of manufacturing an insulating foil conductor having a conductor core consisting of a thin metallic foil strip with a resin insulating coating comprising the steps of
    (a) coating the foil surfaces with a resin having a viscosity in excess of 3,000 cps. by applying the resin to the foil strip surfaces with transfer roll applicators rotating in contact with the foil strip surfaces in a direction opposite to that of the traveling foil strip,
    (b) baking the coated foil strip to cure the resin coating,
    (c) twisting to vertical alignment the coated foil strip without applying tension to the coated foil strip edges,
    (d) passing the lower edge of the coated foil strip, as aligned, through a first acid etching bath to chemically remove a portion of the metallic edges of the foil strip forming a longitudinal pocket between the marginal edges of the foil strip coating surfaces,
(e) removing the foil strip from the acid bath,
(f) reverse twisting the coated foil strip 180° without applying tension to the coated foil strip edges,
(g) passing the lower edge of the coated foil strip, so twisted, through a second acid etching bath to chemically remove a portion of the metallic edges of the foil strip forming a longitudinal pocket between the marginal edges of the foil strip coating surfaces,
(h) regulating the rate of movement of the coated foil strip through the acid etching baths so that the metallic portion removed from each of the foil strip edges is within the range of 20 to 30 microns of foil depth,
(i) immersing the etched edge, coated foil strip into a rinsing bath to remove the acid etchant,
(j) drying the rinsed strip,
(k) immersing the etched edge, coated foil strip into a second resin base bath to uniformly deposit an integral coating within and over the marginal edge pockets and over the coated foil surfaces,
(l) passing the fully coated foil strip through a pair of squeezing rolls to remove the excess resin coating, and
(m) thereafter baking the fully coated foil strip to cure the resin coating.

4. The method of manufacturing of claim 3 which includes the step of longitudinally cutting the marginal edges of the resin coated and baked foil strip prior to the steps of passing the foil strip edges through the acid etching baths to improve the etched depth uniformly upon subsequent etching.

5. The method of manufacturing of claim 3 characterized by the step of operating the transfer roll applicators at circumferential velocity 130 percent greater than the velocity of traveling foil strip.

6. The method of manufacturing of claim 3 characterized in that the baking temperature in the final baking of the fully coated foil strip to cure the coating is at a temperature in a range of 0° C. to 50° C. lower than the temperature in the initial baking of the coated foil strip.

7. The method of manufacturing an insulated foil conductor having a conductor core consisting of a thin metallic foil strip with a resin insulating coating comprising the steps of
(a) applying to the flat foil surfaces of the metallic foil strip a thin coat of resin,
(b) baking the coated foil strip to cure the resin coating,
(c) twisting to vertical alignment the coated foil strip without applying tension to the coated foil strip edges,
(d) passing the lower edge of the coated foil strip, as aligned, through a first acid etching bath to chemically remove a portion of the metallic edges of the foil strip forming a longitudinal pocket between the marginal edges of the foil strip coating surfaces,
(e) removing the foil strip from the acid vat,
(f) reverse twisting the coated foil strip 180° without applying tension to the coated foil strip edges,
(g) passing the lower edge of the coated foil strip, so twisted, through a second acid etching bath to chemically remove a portion of the metallic edges of the foil strip forming a longitudinal pocket between the marginal edges of the foil strip coating surfaces,
(h) regulating the rate of movement of the coated foil strip through the acid etching bath so that the metallic portion removed from each of the foil strip edges is within the range of 20 to 30 microns of foil depth,
(i) immersing the etched edge, coated foil strip into a rinsing bath to remove the acid etching,
(j) drying the rinsed strip,
(k) immersing the etched edge, coated foil strip into a second resin based bath to uniformly deposit an integral coating within and over the marginal edge pockets and over the coated foil surfaces, and
(l) thereafter baking the fully coated foil strip to cure the resin coating.

8. The method of manufacturing of claim 7 characterized by the step of removing excess coating material from the fully coated foil strip immersed in the second resin based bath.

References Cited
UNITED STATES PATENTS

| | | | |
|---|---|---|---|
| 2,471,329 | 5/1949 | Keuffel | 117—111 X |
| 3,049,441 | 8/1962 | Huang | 117—115 |
| 3,061,494 | 10/1962 | Snyder et al. | 156—18 |
| 3,179,635 | 4/1965 | Frost et al. | |
| 3,333,999 | 8/1967 | Wade et al. | 156—3 |
| 3,401,058 | 10/1968 | Lockie et al. | 117—232 |

VERLIN R. PENDEGRASS, Primary Examiner

U.S. Cl. X.R.
117—111; 156—3